United States Patent
Ahlse et al.

[11] Patent Number: 5,493,267
[45] Date of Patent: Feb. 20, 1996

[54] ARRANGEMENT FOR THE TRANSFER OF CONTROL COMMANDS IN AN APPARATUS OR A MACHINE OPERATED FROM THE MAINS

[75] Inventors: Marc R. Ahlse, Linköping; Lennart W. Castwall, Täby; Lars G. Moren, Huddinge, all of Sweden

[73] Assignee: Aktiebolaget Electrolux, Stockholm, Sweden

[21] Appl. No.: 146,003

[22] PCT Filed: Feb. 26, 1993

[86] PCT No.: PCT/SE93/00168

§ 371 Date: Nov. 4, 1993

§ 102(e) Date: Nov. 4, 1993

[87] PCT Pub. No.: WO93/18568

PCT Pub. Date: Sep. 16, 1993

[30] Foreign Application Priority Data

Mar. 6, 1992 [SE] Sweden .................................. 9200703

[51] Int. Cl.$^6$ .................................................. H04M 11/04
[52] U.S. Cl. ................... 340/310.02; 340/310.01; 340/310.04; 340/825.22
[58] Field of Search .............. 340/310.01, 310.02, 340/310.04, 825.22, 825.23; 318/807, 808, 809, 810, 811

[56] References Cited

U.S. PATENT DOCUMENTS

| | | | |
|---|---|---|---|
| 4,007,458 | 2/1977 | Hollabaugh | 340/310.01 |
| 4,477,763 | 10/1984 | Asano et al. | 318/809 |
| 4,706,180 | 11/1987 | Wills | 318/811 |
| 4,719,400 | 1/1988 | Kurakake et al. | 318/811 |
| 4,990,908 | 2/1991 | Tuny | 340/310.01 |
| 5,146,146 | 9/1992 | Sämann | 318/809 |
| 5,200,684 | 4/1993 | Fisher | 318/809 |
| 5,331,537 | 7/1994 | Skarpatowski | 318/811 |
| 5,355,070 | 10/1994 | Cocconi | 318/811 |

Primary Examiner—John K. Peng
Assistant Examiner—Ashok Mannava
Attorney, Agent, or Firm—Pearne, Gordon, McCoy & Granger

[57] ABSTRACT

An arrangement in an apparatus or a machine operated from the mains for the transfer of control commands to at least one working means (24) in the apparatus or machine, e.g. a motor or the like, via a wire (13) also used for the power supply to said working means. The arrangement comprises a control unit (10) provided for creating a control command by suppressing, in a predetermined order, at least part of one or several consecutive half-periods of a predetermined polarity of the supply voltage. Moreover, the arrangement comprises a slave unit (11) operating in response to the control command transmitted to activate the working means (24). The control unit (10) has such a design that before a control command is transmitted the control unit operates to shortly disconnect the supply voltage on the wire (13) for a period of time required for the current in the working means (24) to decline essentially to zero.

7 Claims, 2 Drawing Sheets

ARRANGEMENT FOR THE TRANSFER OF CONTROL COMMANDS IN AN APPARATUS OR A MACHINE OPERATED FROM THE MAINS

BACKGROUND OF THE INVENTION

The present invention pertains to an arrangement in an apparatus or a machine operated from the mains for the transfer of control commands to at least one working means in the apparatus or machine, such as a motor or the like, via a wire also used for the power supply to the working means. The arrangement includes a control unit provided for creating a control command by suppressing, in a predetermined order, at least part of one or several consecutive half-periods of a predetermined polarity of the supply voltage, and a slave unit operating in response to the control command transmitted to activate the working means.

In the U.S. Pat. Nos. 4,007,458 and 4,131,882 there are disclosed arrangements as described above. However, in these references the arrangements have been used in irrigation systems including a great number of valves and the object has been to convey out, in a simple way by means of the power supply cable, control commands for the control of the different valves.

If an arrangement of the kind described is to be used in an apparatus or a machine having several working means with inductive properties, such as motors, it has been difficult for the slave unit to interpret the control command if being sent while any such inductive working means is operating. The change in a number of half-cycles, obtained by suppressing of at least part of the cycle, is counteracted by the repugnance of the working means against changes and, as a result, the slave unit will experience difficulties in unambiguously identifying a control command being sent.

SUMMARY OF THE INVENTION

An object of the invention is to remedy the problems present in the prior art and to provide an arrangement of a design such that control commands transmitted by a control unit can be unambiguously interpreted by a slave unit for the correct control of the working means to be operated. The object is achieved by a design of the control unit wherein, before a control command is transmitted, the control unit operates to shortly disconnect the supply voltage on the wire for a period of time required for the current in the working means to decline essentially to zero.

BRIEF DESCRIPTION OF THE DRAWINGS

The invention will now be described more in detail in connection with an embodiment with reference to the enclosed drawings, in which.

DETAILED DESCRIPTION OF THE PREFERRED EMBODIMENT

The illustrated and preferred embodiment of the present invention is intended to be used in a dishwasher, the main function and design of which being conventional. Accordingly, no detailed description of the dishwasher will be given and the dishwasher will only be commented on in general terms when needed. Hence, such a machine may comprise a dishwashing compartment supplied with water via a solenoid valve and drained of cleaning and rinsing liquid via a drainage pump. Further, in such machine a circulation pump is provided for the supply of cleaning and rinsing liquid to rotating spray-arms provided with holes and spraying liquid, in a conventional way, onto dish goods supported in baskets in the dish-washing compartment. For the dosage of detergent there is provided a dosing device which via a door, which can be opened by magnetic means, supplies a dose of powder from a dosage compartment covered by the door. Accordingly, the various working means which in this case have to be controlled by a programmer are the circulation pump, the drain pump, the dosage device and the solenoid valve. Preferably, in this case the programmer is of the electronic type and includes a microprocessor, a program memory and additional electronic components.

Figure 1:
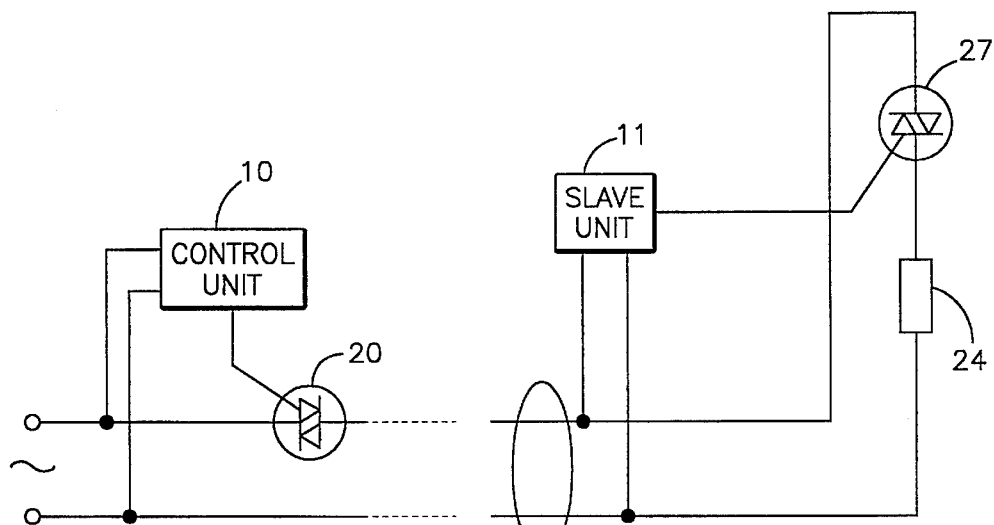
FIG. 1 shows a block diagram of the arrangement according to the present invention.
Figure 2:
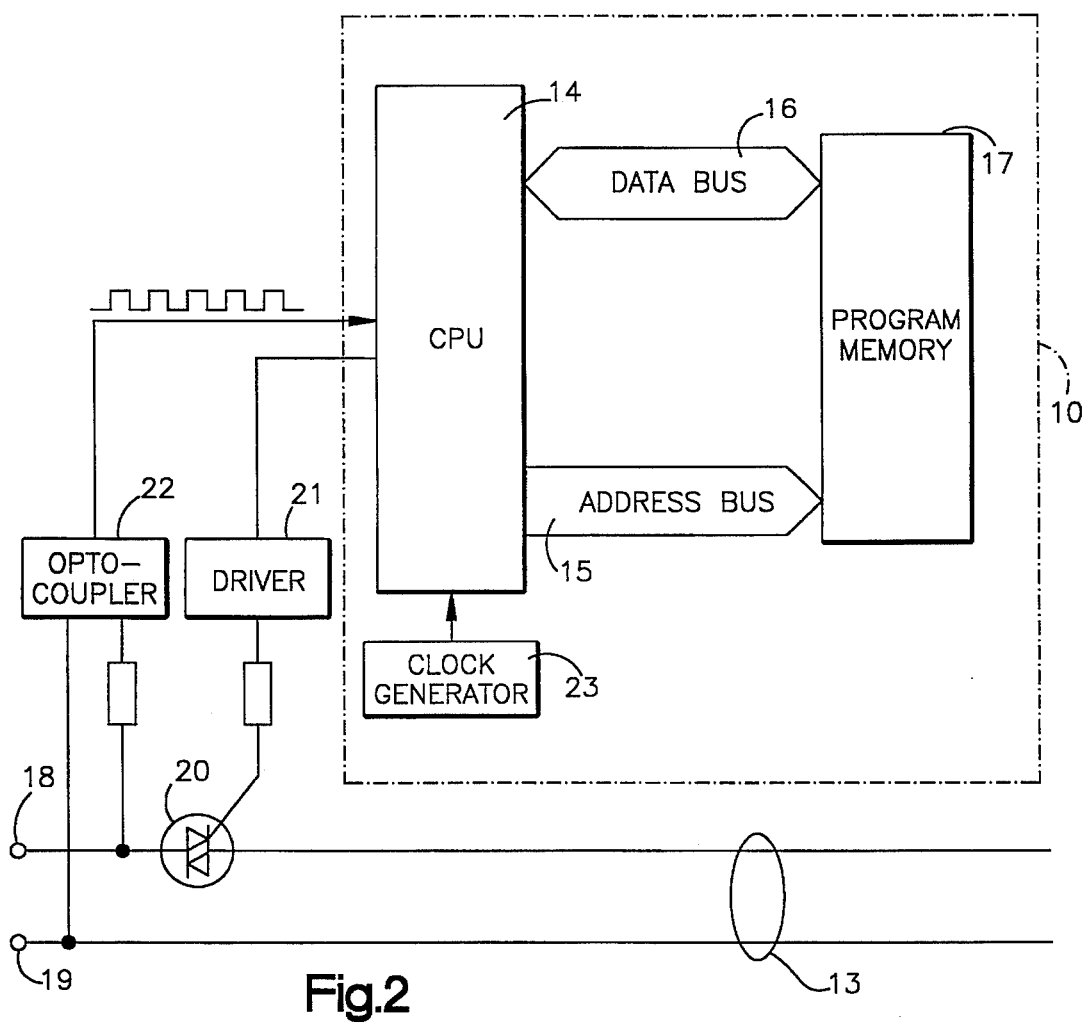
FIG. 2 schematically shows a control unit according to the invention.

In the following description the control components concerned have been removed from the dishwasher together with one of the working means and these details are shown schematically in the block diagram of FIG. 1. Accordingly, the control arrangement comprises a control unit 10 and a slave unit 11 interconnected by a line 13, referred to as a bus line. In the line 13 a triac switch 20 is connected by which the voltage to the slave unit 11 can be broken, either permanently or temporarym when a control command is to be transmitted. A working means 24 is connected to the slave unit 11 via a triac switch 27. As shown in greater detail in FIG. 2, the control unit consists of a microprocessor 14 which in a known way communicates, via an address bus 15 and a data bus 16, with a program memory 17. Via terminals 18, 19 the bus line 13 is connected to a mains AC network and via the triac switch 20 the bus line 13 is connected to the slave unit 11. The triac switch 20 is controlled, via a driver circuit 21, from the microprocessor 14. An opto coupler 22 is used to supply phase information from the supplied AC voltage to the microprocessor 14. In the usual way the microprocessor is also connected to a clock pulse generator 23.

Figure 3:
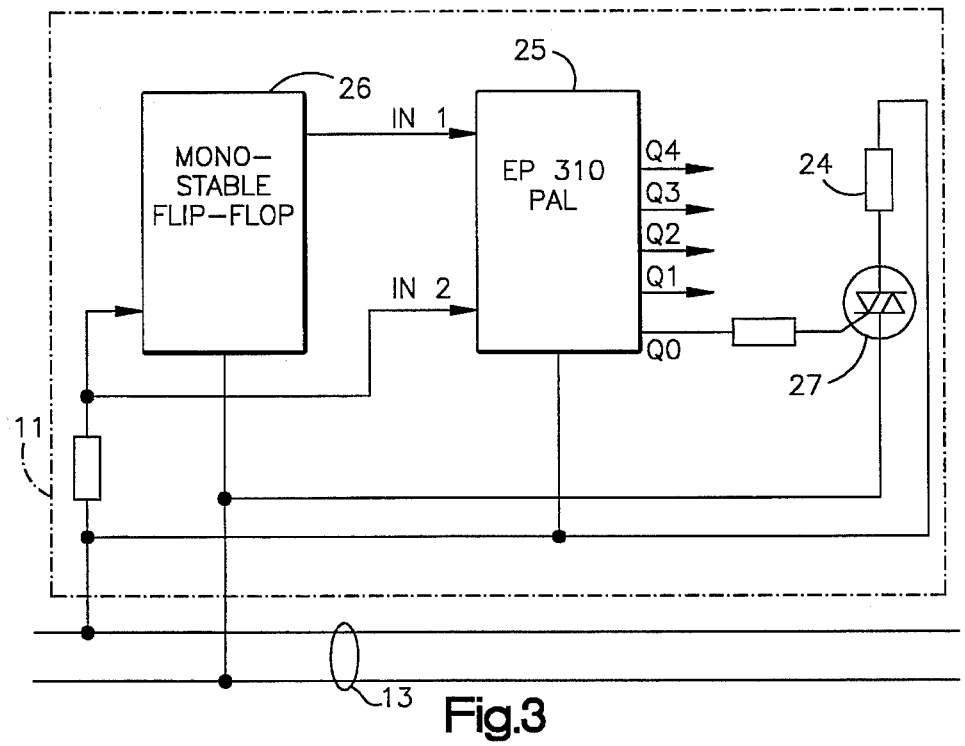
FIG. 3 schematically shows a slave unit having a working means connected to it.

The microprocessor 14 and the program memory 17 constitute an electronic programmer determining the function of the connected machine, here the dishwasher, the programmer controlling the activation of the different working means, here represented by the load 24, see FIG. 3. The last-mentioned figure shows the slave unit 11 which comprises an electronic circuit 25 referred to as EP310 PAL Altera. The circuit has two inputs IN1 and IN2 of which IN1 is connected to a monostable flip-flop 26. The flip-flop 26 is triggered by each positive half-period of the supply voltage generating pulses of a constant width. The second input IN2 of the circuit 25 is directly connected to the supply AC voltage and in a manner not disclosed in detail the circuit uses the positive half- periods on the input IN2 to be compared with the pulses on the input IN1 in order to determine the nature of the data information transferred, "1" or "0". The circuit 25 has a number of outputs Q0–Q4 to which the different loads are connected. In the example the only load 24 is connected to the output Q0 via a triac switch 27.

Figure 4:
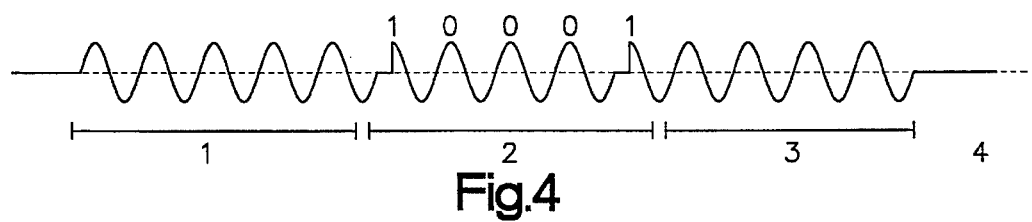
FIG. 4 and 5 show diagrams of waveforms of signals transferred between the control unit and the slave unit.

More or less sophisticated methods can be used in creating a control command for activation or inactivation of one or several of a number of working means or loads. In a domestic dishwasher or laundry washing machine it is of great value, however, if codes are used which are as simple as possible. As a result the command for disconnection is equal to breaking of the voltage while the command for switching-on of a load is equal to a binary code activating the respective output of the circuit 25 in the slave unit. For activation of the outputs Q0–Q4 binary codes 10001, 10010, 10011, 10100 and 10101 are used where in each code the first "1" is a start bit. In the diagram of FIG. 4 there is shown the waveform of the supply voltage transmitted on the bus line with a control command for the output Q0 included. According to the invention, first the voltage is broken for a time period sufficient for all working means to be disconnected and all motors to be standstill. Then the voltage is switched-on for a shorter period to allow the condition of the slave unit 11 to stabilize. In the diagram this phase has been marked by the digit 1. Then follows the control command itself which starts with a start bit represented by a "1". The "1" is represented by a half-period of the supply voltage suppressed during 50% of its duration whereas a "0" is represented by a full half-period. In addition to the start bit, the control command comprises four additional bits and with respect to the output Q0 said command consists of three "0" followed by a "1". The real control command is shown in phase 2 of the diagram. In the following phase, marked 3, the supply voltage is completely unaffected representing the condition in which the working means is activated. Then, when the working means is to be disconnected, the supply of current is disrupted by opening of the triac switch 20. This phase has been designated by 4 in the diagram.

Figure 5:
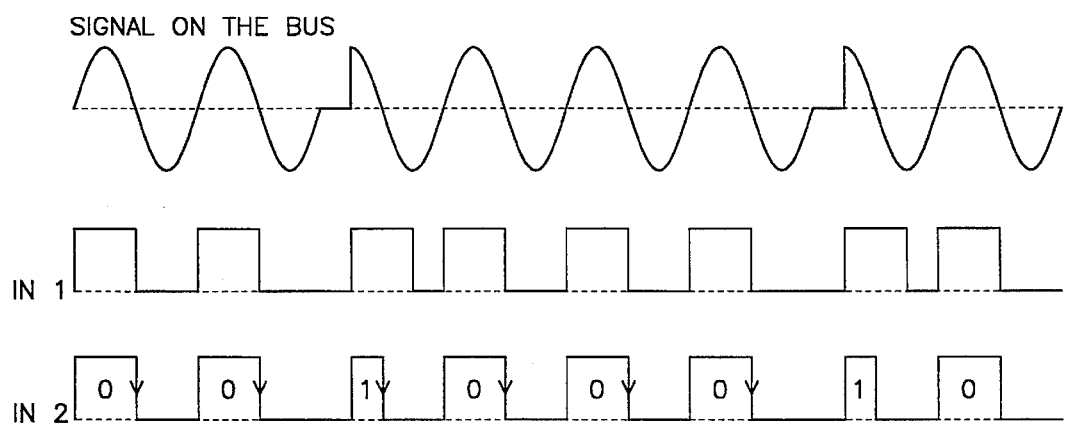

In the diagram of FIG. 5 those pulses are shown which have been discussed above and are present in the circuit 25 as the result of the signals on inputs IN1 and IN2. The circuit 25 is provided with a shift register, not shown, which is being filled with the ones and zeros which represent the transmitted control command. When the start bit is present in a predetermined position in the shift register the control command is retrieved and gated to the corresponding output, in this case Q0, via a logic network or the like, activating said output and the working means connected thereto. The connection takes place by closing of a triac switch 27. The working means remains connected for a period determined by the electronic programmer and, when the period has lapsed, disconnection takes place by the triac switch 20 being operated to take its open position.

It might be considered as a drawback that the current supply has to be disrupted every time a new working cycle is to be initiated. However, practice has shown that the function of the machine has got no negative influence while, at the same time, a control system has been achieved which is very simple and which, as a result, can be manufactured at a low cost. In a dishwasher, and even more in a laundry washing machine, there is a problem in that a great number of wires are needed for the connection of the different working means to one another and to the programmer. By using the arangement according to the invention most of the wiring otherwise needed will disappear and the number of signal wires is reduced to a minimum.

The invention is not limited to the embodiment described above and shown in the drawings and modifications can be made within the scope of the inventive idea expressed in the claims. Accordingly, both the control unit and the slave unit can be otherwise designed and with other components. The latter has been shown as provided with a number of outputs corresponding to the number of working means to be connected. Instead, a number of slave units can be provided where each slave unit is associated with one working means only. Further, the code chosen can of course be modified in the desired way in accordance with known code patterns and the control unit can be modified accordingly. Even though the invention has been made to be used primarily in dishwashing and laundry washing machines it can of course be applied in all those apparatuses and machines where there is a need for control commands to be sent for the connection and disconnection of working means having inductive properties.

We claim:

1. An arrangement in a machine operated from the mains for the transfer of control commands to at least one working means (24) in the machine via a wire (13), said wire also being used to connect the power supply to said working means, the arrangement comprising a control unit (10) for creating a control command by suppressing, in a predetermined order, at least part of one or several consecutive half-periods of the supply voltage, and a slave unit (11) operating in response to the control command transmitted to activate the working means (24), wherein the control unit (10) is designed such that, before the control command is transmitted, the control unit operates to shortly disconnect the supply voltage on the wire (13) for a period of time required for the current in the working means (24) to decline essentially to zero.

2. An arrangement according to claim 1, wherein the consecutive half-periods of the AC supply voltage are of a predetermined polarity.

3. An arrangement according to claim 1 or 2, wherein one end of the wire (13) is connected to the mains and that between said one end and the slave unit (11) an electronic switch (20) is provided which disconnects the voltage to the slave unit (11) in response to a control signal from the control unit (10) both prior to the transmission of the control command and for suppress ion of predetermined half-periods forming the control command.

4. An arrangement according to claim 3, wherein the electronic switch (20) is a triac switch.

5. An arrangement according to claim 1, wherein essentially 50% of the positive half-period of the AC supply voltage is being suppressed to form one of two binary states of a binary code forming the control command.

6. An arrangement according to claim 5, wherein the slave unit (11) comprises an electronic circuit (25) having two inputs (IN1, IN2) and a number of outputs (Q0–Q4) corresponding to the number of working means (24), one (IN1) of said inputs being connected to a monostable flip-flop (26) to receive from said flip-flop a positive pulse of constant width generated each time a positive half-period appears on the wire (13), while the other input (IN2) is directly connected to the wire, the electronic circuit (25) being designed so that a comparison between the pulses from the flip-flop (26) and pulses generated by the circuit, in correspondence with the positive half-periods on the second input (IN2), decodes the transmitted control command.

7. An arrangement according to claim 6, wherein the working means (24) is connected in series with an electronic switch (27) having a control input connected to the output (Q0) of the electronic circuit (25).

* * * * *